April 13, 1954     F. R. ALLIN     2,675,021

CHECK VALVE

Filed Oct. 24, 1952

INVENTOR.
FREDERICK R. ALLIN
BY
RICHEY, WATTS, EDGERTON & McNENNY

ATTORNEYS

Patented Apr. 13, 1954

2,675,021

UNITED STATES PATENT OFFICE 2,675,021

CHECK VALVE

Frederick R. Allin, Wadsworth, Ohio, assignor to The Weatherhead Company, Cleveland, Ohio, a corporation of Ohio Application October 24, 1952, Serial No. 316,706

4 Claims. (Cl. 137—536)

This invention relates to check valves, and, more particularly, to such valves adapted for use in high-pressure systems.

Although the following example is not intended to be limiting, one application for the valve of the invention is in hydraulic installations for aircraft. In such installations, the tendency is toward higher and higher pressures, in order to save weight without sacrificing power. Present designs may employ pressures as high as 3,000 lbs. p. s. i. The check valves inserted in such lines must be capable of opening on a relatively small minimum pressure differential, a differential of 40 to 75 lbs. (1.33% to 2.5%) being common in the design.

Such valves must handle a high rate of fluid flow. For example, a check valve of the ½ inch size may be required to pass 12½ gallons per minute at the aforesaid pressure. In addition the valve must be capable of operating under extreme conditions such as those wherein the pressure on the outlet side of the valve drops far below its normal 3,000 lb. value resulting in a greatly increased pressure differential on the valve from that encountered in normal operation.

All of these factors present serious difficulties and problems. For example, the valve spring must be relatively light if the valve is to open on a low pressure differential, so that it must be protected from the fluid flowing through the valve. Not only must the valve spring be guarded so that fluid cannot flow over it in its normal path, but it is equally important that there be no direct impact of the fluid against the spring under extreme conditions of flow because such impact would impart a permanent set to the spring or might even blow it clear of the valve.

It is an object of the present invention to provide protection for the relatively light spring from the deleterious action of the high-pressure fluid without depending upon sliding sealing engagement between the valve member and its casing or body. Such sliding sealing engagement is not only ineffective and subject to deterioration due to wear, but if the sealing engagement is made tight enough to be effective the valve becomes sluggish and does not respond to the relatively small pressure differentials required for its operation.

In the present invention the valve spring is protected by two cooperating means, neither of which depends upon friction sealing with the case. These means provide a valve spring chamber that is sealed from impact of the fluid ahead of the spring by annular seats formed on the valve member and the body which engage when the valve member moves axially to its open position. The spring is likewise protected from dynamic fluid flow without sliding engagement by a simple guard means extending rearwardly past the valve chamber which directs the fluid away from the chamber so that it has no tendency to flow into the same.

In aircraft installations in particular, size and weight are important factors and every ounce or fraction of an ounce that can be saved in the various components of the system are of extreme importance. Furthermore, due to the severe service encountered the valve seats receive a severe pounding action, but in prior valves it has not been feasible to extend the valve seats over a large area because with prior constructions that would necessarily lengthen the valve, or if the valve were not lengthened it would have to be designed in such a way that fluid could impinge upon the valve spring.

Another advantage of applicant's sealing means for the valve spring chamber resides in the fact that the valve seat and the valve member can be tapered and provide for engagement over a large area whereby impact loads are reduced. Provision of the large seating area does not lengthen the valve because the ports through the valve member need not extend through the tapered nose, but can be formed further rearwardly than in prior devices without permitting fluid to flow into the valve spring chamber. This is because there need be no seal between the valve member and body behind the seating surfaces since the spring chamber is sealed when the valve is opened by the novel sealing means.

With check valves operating in high-pressure lines on small pressure differentials, difficulties have been encountered with chattering and pounding against the seat. Attempts have been made to eliminate this trouble by arranging the valve for hydraulic cushioning, but such a construction requires close fits and increases the frictional force on the valve reducing its sensitivity.

Attempts to provide the usual soft seats, such as rubber, are unsuccessful because the rubber is rapidly eroded by the fluid flowing under high-pressure, or if in the form of a rubber ring in a groove in the valve member the ring is torn loose from the valve member by the fluid flow. Accordingly, in valves for high-pressure service it has been customary to provide metal-to-metal contact between the parts and rely on other means to prevent chattering and pounding. However, I have found that the advantages of a soft seat can be maintained with the elimination of chattering and pounding without need for hydraulic cushioning if the seat is in the form of a nylon ring tightly fitting the groove in the valve member. The nylon material is soft enough to form a good seat and hard enough so that it cannot be torn free of its groove or eroded by the flow of fluid. The nylon ring in combination with a positive stop for the valve in its open position and the protected spring, all of which are provided without closely fitting sliding surfaces between the valve member and body, provides a high-pressure check valve that does not chatter or pound whether just partly opened or fully opened and it is sensitive and simple to manufacture.

It is a feature of a preferred embodiment of the invention that the length thereof is reduced from the prior constructions having protected springs by having the rearward body portion overlying the spring and extending toward a shoulder on the valve portion. This forms a pair of mutually facing shoulders or seats for sealing the spring as mentioned previously, and since the extension of the rearward body portion is present it may be threaded and utilized to join the portion to the other body portion therby reducing the length of the casing.

Another object of the invention resides in a method of forming the nose of a valve member wherein the nylon ring is placed over a stem and against a radial wall and a retaining ring slipped over the stem and riveted thereto. The nylon ring may be made a little wider than the groove formed by the assembled parts and prevents fluid from seeping around the ring. The nylon ring is hard enough so that it may be readily machined after assembly to form the proper seating surface.

The manner in which these and other objects are accomplished will be understood by reference to the following detailed description of a preferred embodiment of the invention.

Figure 1:
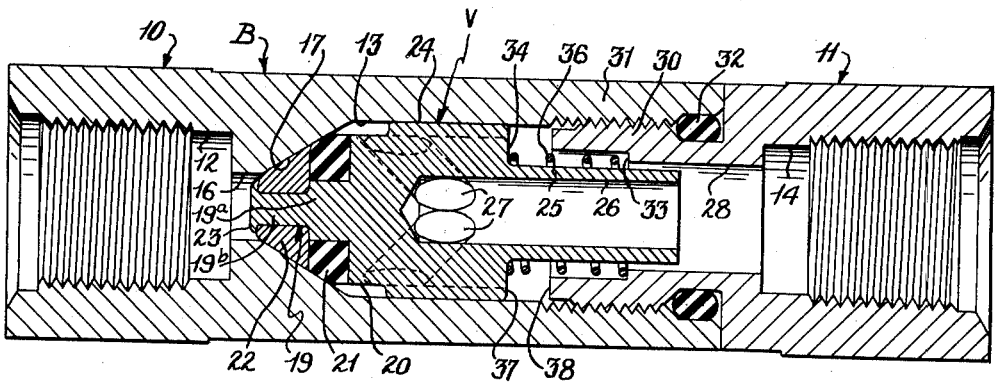
Fig. 1 is a longitudinal section through the valve in its closed position.
Figure 2:
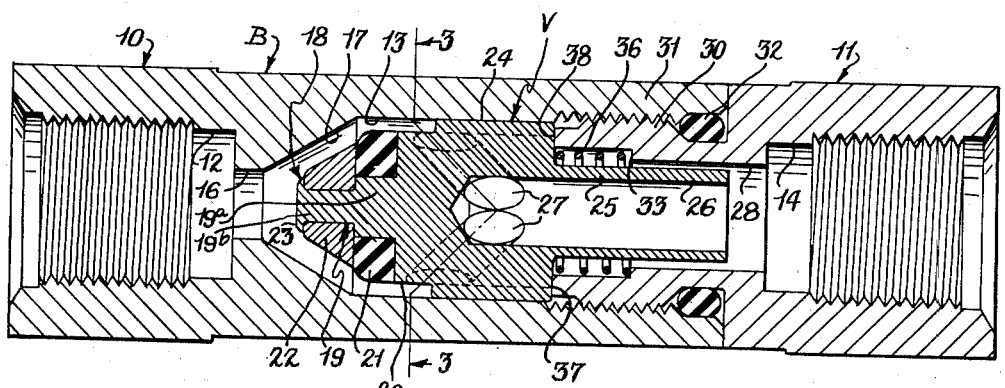
Fig. 2 is a longitudinal section through the valve in its open position.
Figure 3:
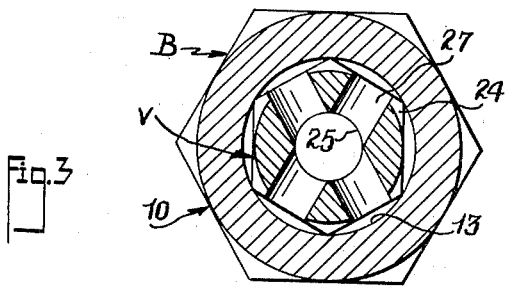
Fig. 3 is a section taken along 3—3 of Fig. 2.

Referring to the drawings, the valve member comprises two major parts; a casing or body B, and a valve or poppet member V therein. The body B is a simple two-piece construction comprising forward section 10 and rearward section 11 threaded thereto.

The assembled body has a through bore forming inlet port 12 and intermediate valve chamber 13 and an outlet port 14. There is a reduced portion 16 surrounding the inlet port which has a tapered or conical wall 17 leading to the valve chamber. The forward or nose portion 18 of the valve member is formed with a stem 19 of two diameters which cooperates with an initially separate nose portion 22 to form a groove to receive the nylon sealing ring 21. Before the nose portion 22 is assembled, nylon ring 21 is slipped over the larger diameter section 19a of stem 19 and is preferably somewhat wider than the enlarged portion thereof. The tapered ring 22 is then slipped over the smaller diameter section 19b of stem 19 and forced against the shoulder by means of a riveting operation as at 23. This compresses the nylon ring firmly against the three walls of the groove and tends to extrude it radially somewhat. Since nylon is readily machinable, the periphery of the ring may be trimmed or turned to be a continuation of the tapered exterior of ring 22.

The valve member V also includes an intermediate pilot portion 24 of non-circular or hexagonal cross-section which slides freely within the wall of valve chamber 13. There may be an intermediate section 20 of reduced diameter between the tapered nose and the pilot portion 24. A stem 25 extends rearwardly from pilot portion 24 and is bored as at 26, there being fluid passageway means 27 leading from the exterior of the valve member to the bore 26. Stem 25 may slide within the bore 28 in the rearward body section with ample clearance.

The rearward body section includes a threaded extension 30 which is threaded into the mating threaded body portion 31 of section 10. An O-ring seal 32 is preferably provided at the junction of the body sections. A rearward spring seat 33 is formed on the body and the forward spring seat 34 is formed on the valve member facing the other seat. A relatively light spring 36 engages the seats and urges valve V to its closed position. Outwardly of the spring seat 34 is a seat or shoulder 37 which faces complementary seat or shoulder 38 on the free end of body section extension 30.

*Operation*

Assume that the valve is connected in a line containing fluid under high-pressure, say 3,000 lbs. p. s. i. Assume now that pressure rises in the inlet port 12. In normal operation the pressure differential required to open the valve fully is so small compared to the magnitude of the total pressure in the system, (1.33% to 2.5% for example) that the pressure variations normally encountered tend to open the valve completely. Thus, seat or shoulder 37 is brought against seat 38 so that fluid which might tend to flow past the non-circular periphery 24 is sealed from the spring chamber. This seal is obtained without close sliding fits and without need for a seal at the outlet of the chamber as in prior constructions. Thus, the spring may be quite light and the valve very sensitive, so that the range of pressures between that which provides a partially open valve and that which fully opens the valve is very small. This in itself tends to reduce chattering at the seat, but such chattering and pounding is further reduced and made less objectionable by the cushioning action of the nylon seat. Also, shoulders 37 and 38 not only seal the spring chamber but also act as positive stops which hold the valve in its open position without damaging the spring.

Although the portion of sleeve 25 that extends rearwardly of the spring has a loose fit with the valve body seat it extends well into bore 28 and acts as a guard or deflecting member that shields the spring from fluid flow passing through the valve. Thus, without any closely-fitting, circular, slidably-engaging surfaces either at the inlet or the outlet of the valve chamber, the valve spring is protected from damage by fluid flow and pressure and the spring may be very light because of the elimination of friction surfaces.

Since the spring is light, when the pressure differential opens the valve the valve usually moves to its fully open position, which reduces tendency to chatter against the seat and permits the use of a soft seat which not only provides a better sealing surface that is not battered or pounded, but tends to cushion any slight chattering that occurs.

The double utilization of extension 30 and valve member 11 to serve as both a threaded coupling member and a member partially surrounding the spring and form another rearward stop 35 permits the casing to be made shorter without reducing the length of the threaded engagement.

Because of the presence of the seats 37 and 38, pilot portion 24 can be made non-circular and free-sliding. Also, sleeve extension 25 may have ample clearance with bore 28 of the body, there being no need for a sleeve extending within bore 26 to protect the spring. Thus, only a two-part casing is required, yet the valve spring is protected and the valve member has an exceptionally free motion in its body.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

Having thus described the present invention so that others skilled in the art may be able to understand and practice the same, I state that what I desire to secure by Letters Patent is defined in what is claimed.

What is claimed is:

1. A fluid pressure check valve comprising a body having a through bore with terminal inlet and outlet ports and an intermediate valve chamber, a tapered valve seat surrounding said inlet port, a valve member in said chamber formed with a tapered nose portion providing sealing means for engaging said valve seat, the fluid under pressure in said inlet port urging said valve member away from said valve seat, a pilot portion of non-circular section rearwardly of said nose portion engaging the wall of said valve chamber, and a stem portion extending rearwardly from said pilot portion, fluid passageway means intersecting said pilot portion and leading rearwardly through said stem portion, mutually facing spring seats formed on said valve member and in said body bore respectively, complementary annular seats formed on said valve member and said body, said annular seats being radially outwardly of said spring seats, said seats and the intermediate walls of the valve member and body defining a spring chamber, a valve spring in said chamber and engaging said spring seats, said annular seats being in engagement when the valve is open to seal said spring chamber from entry of fluid tending to pass between the periphery of said valve member pilot portion and the wall of said valve chamber.

2. A fluid pressure check valve comprising a body having a through bore with terminal inlet and outlet ports and an intermediate valve chamber, a valve seat surrounding said inlet port, a valve member in said chamber formed with a forward portion providing sealing means for engaging said valve seat and a stem portion extending rearwardly from said head portion, the fluid under pressure in said inlet port urging said valve member away from said valve seat, fluid passageway means leading from the exterior of said valve member rearwardly of said sealing means through said stem portion, mutually facing spring seats formed on said valve member and in said body bore respectively, complementary annular seats formed on said valve member and said body, said annular seats being radially outwardly of said spring seats, said seats and the intermediate walls of the valve member and body defining a spring chamber, a valve spring in said chamber and engaging said spring seats, said stem portion extending rearwardly past said body spring seat with the valve open whereby there is no tendency for fluid flowing under pressure through said valve to flow into said spring chamber, said annular seats being in engagement when the valve is open to seal said spring chamber from entry of fluid tending to pass between the periphery of said valve member and the wall of said valve chamber.

3. A fluid pressure check valve comprising a body having a through bore with terminal inlet and outlet ports and an intermediate valve chamber, a tapered valve seat surrounding said inlet port, a valve member in said chamber formed with a tapered nose portion providing sealing means for engaging said valve seat, the fluid under pressure in said inlet port urging said valve member away from said valve seat, a pilot portion of non-circular section rearwardly of said nose portion engaging the wall of said valve chamber, and a stem portion extending rearwardly from said pilot portion, fluid passageway means intersecting said pilot portion and leading rearwardly through said stem portion, mutually facing spring seats formed on said valve member and in said body bore respectively, complementary annular seats formed on said valve member and said body, said annular seats being radially outwardly of said spring seats, said seats and the intermediate walls of the valve member and body defining a spring chamber, a valve spring in said chamber and engaging said spring seats, said stem portion extending rearwardly past said body spring seat with the valve open whereby there is no tendency for fluid flowing under pressure through said valve to flow into said spring chamber, said annular seats being in engagement when the valve is open to seal said spring chamber from entry of fluid tending to pass between the periphery of said valve member pilot portion and the wall of said valve chamber.

4. A fluid pressure check valve comprising a body having a through bore with terminal inlet and outlet ports and an intermediate valve chamber, a tapered valve seat surrounding said inlet port, a valve member in said chamber formed with a tapered nose portion, an annular nylon sealing ring compressed in said nose portion for engaging said valve seat, the fluid under pressure in said inlet port urging said valve member away from said valve seat, a pilot portion of non-circular section rearwardly of said nose portion engaging the wall of said valve chamber, and a stem portion extending rearwardly from said pilot portion, fluid passageway means intersecting said pilot portion and leading rearwardly through said stem portion, mutually facing spring seats formed on said valve member and in said body bore respectively, complementary annular seats formed on said valve member and said body, said annular seats being radially outwardly of said spring seats, said seats and the intermediate walls of the valve member and body defining a spring chamber, a valve spring in said chamber and engaging said spring seats, said annular seats being in engagement when the valve is open to seal said spring chamber from entry of fluid tending to pass between the periphery of said valve member pilot portion and the wall of said valve chamber.

References Cited in the file of this patent

UNITED STATES PATENTS

| Number | Name | Date |
|---|---|---|
| 2,318,449 | Beeh | May 4, 1943 |
| 2,431,769 | Parker | Dec. 2, 1947 |
| 2,505,376 | Asselin | Apr. 25, 1950 |

FOREIGN PATENTS

| Number | Country | Date |
|---|---|---|
| 139,292 | Great Britain | Mar. 4, 1920 |
| 48,685 | Denmark | Apr. 30, 1934 |